United States Patent [19]

Atsukawa et al.

[11] 4,374,812

[45] Feb. 22, 1983

[54] PROCESS FOR STACK GAS TREATMENT

[75] Inventors: Masumi Atsukawa; Naoharu Shinoda; Atsushi Tatani, all of Hiroshima; Taku Shimizu, Kawasaki, all of Japan

[73] Assignee: Mitsubishi Jukogyo Kabushiki Kaisha, Tokyo, Japan

[21] Appl. No.: 211,083

[22] Filed: Nov. 28, 1980

Related U.S. Application Data

[63] Continuation of Ser. No. 56,613, Jun. 11, 1979, abandoned.

[30] Foreign Application Priority Data

Jul. 11, 1978 [JP] Japan .................................. 53-84239

[51] Int. Cl.$^3$ .............................................. C01B 17/00
[52] U.S. Cl. ...................................... 423/242; 423/166
[58] Field of Search ............... 423/242 A, 242 R, 243, 423/244 A, 244 R, 166

[56] References Cited

U.S. PATENT DOCUMENTS 2,080,779 5/1937 Lessing .......................... 423/242 A
3,980,756 9/1976 Dixson et al. .................. 423/242 A

*Primary Examiner*—O. R. Vertiz
*Assistant Examiner*—Gregory A. Heller
*Attorney, Agent, or Firm*—Wyatt, Gerber, Shoup, Scobie & Badie

[57] ABSTRACT

A wet process for stack gas treatment wherein the stack gas is scrubbed with a suspension containing calcium hydroxide and/or calcium carbonate to remove sulfur oxides from the gas, characterized in that (1) air or oxygen-containing gas is supplied to the gas scrubber so as to oxidize at least 18% of the sulfur oxides absorbed by the scrub liquid to gypsum, and then part of the gypsum from the gypsum-containing scrub liquid partly taken out is recycled to the scrubber, or (2) part or whole of the scrub liquid is taken out from the scrubber into an oxidizer, where it is oxidized with the supply of air or oxygen-containing gas, and, after the oxidation, part of the scrub liquid from the oxidizer is recycled to the scrubber, whereby at least 18% of the sulfur oxides absorbed from the gas by the scrub liquid is oxidized to gypsum.

1 Claim, 4 Drawing Figures

F I G.1 Prior art
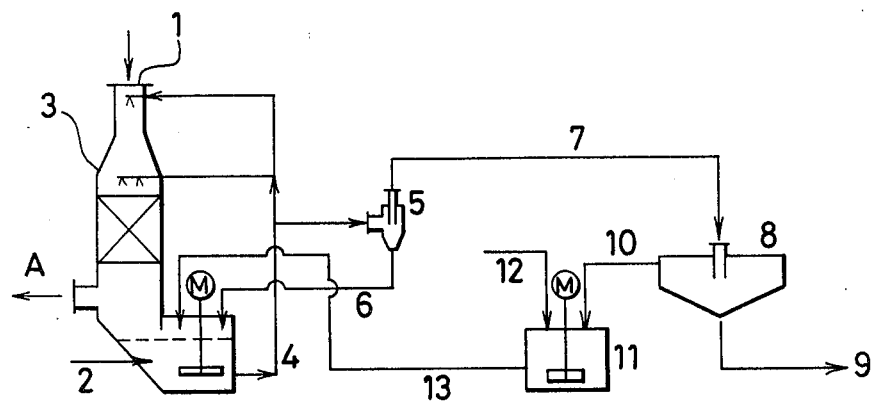
F I G.2 Example 1
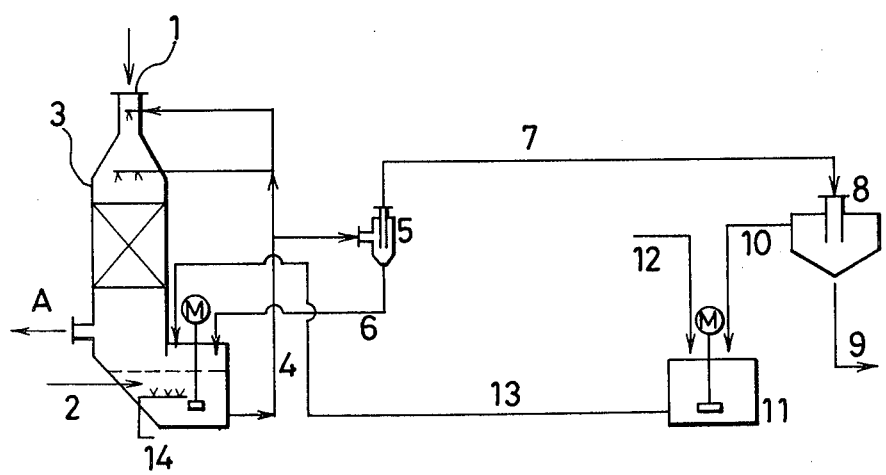

FIG.3 Example 2
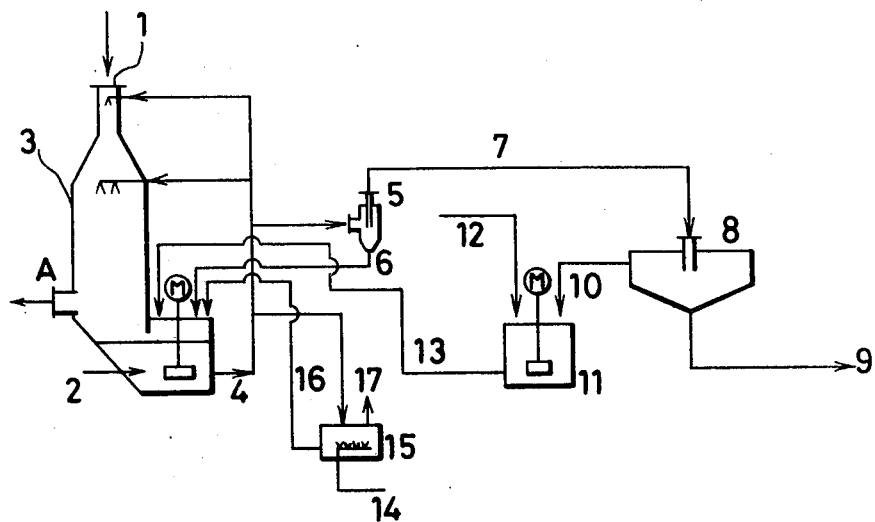
FIG.4
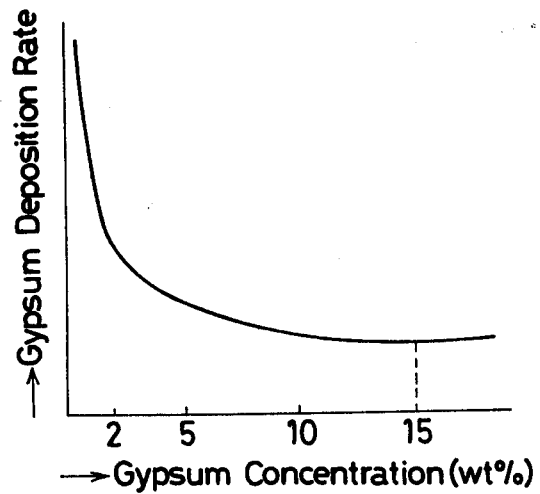

PROCESS FOR STACK GAS TREATMENT

This is a continuation of application Ser. No. 056,613 filed June 11, 1979, now abandoned This invention relates to a wet process for stack gas desulfurization whereby sulfur oxides (SOx) are removed from stack gas by use of a suspension of calcium hydroxide (Ca(OH)$_2$) and/or calcium carbonate (CaCO$_3$).

With the known desulfurization processes which use a slurry of Ca(OH)$_2$ or CaCO$_3$ in the removal of SOx from stack gas, a knotty problem has been the tendency of the gypsum formed in the stack gas scrubbing apparatus (scrubber) adhering and accummulating in the form of scale on the inner walls of the scrubber. Control of this scaling has, therefore, been considered to be a most important technical subject in the art. One successful approach to the subject has been the circulation of seed crystals, that is, a technique of introducing a predetermined amount or more of seed crystals of gypsum into the scrubbing liquor or scrub liquid in a scrubber and thereby allowing the gypsum being freshly formed in the scrubber to deposit and grow over the seed crystal surfaces so as to avoid the deposition on the inside of the scrubber. The technique is in wide use as an excellent measure to counter the scaling.

The present invention pertains to the seed crystal circulation, an important technique for preventing scaling in the scrubber.

It is well-known that the SOx removal from stack gas with the aid of the Ca(OH)$_2$ or CaCO$_3$ slurry gives birth to calcium sulfite (CaSO$_3$) and calcium sulfate (CaSO$_4$) in the scrub liquid, both of which mostly separate out in solid phases because of poor solubilities and remain suspended in the liquid.

This invention is directed to a technique for preventing scaling in the scrubbers of full-scale commerical plants, such as for the treatment of stack gas from boilers, on the basis of the phenomenon that the critical ratio between CaSO$_3$ and CaSO$_4$ to be formed in the scrub liquid as a result of the SOx removal is 82:18 and that if the proportion of CaSO$_4$ becomes excessive the two products will separate out in solid phases as heretofore but if the proportion is insufficient, CaSO$_4$ will not separate out singly but will be incorporated in the crystal lattices of CaSO$_3$ that has separated out in a solid phase. The scaling problem common to the existing installations will now be described in further detail.

FIG. 1 is a flow diagram of a typical process of the prior art.

Exhaust gas from a coal-fired boiler, for example, is introduced into a scrubber 3 at the inlet duct 1 and is cooled and freed from dust by scrub liquid in the inlet zone of the vessel. An alternative method of cooling and dedusting the gas by separate cooling and dust collecting means prior to its inflow into the scrubber is, of course, known in the art, and the present invention is applicable to the alternative, too. For the cooling purpose, part of the water in the scrub liquid is lost by evaporation but is replenished with makeup feed 2. The gas is further cooled and dedusted in the main body of the scrubber 3 while, at the same time, SOx in the gas are taken up by the scrub liquid.

Where CaCO$_3$ is used as the absorbent, the reactions involved in the SOx removal will be:

$$CaSO_3 + SO_2 + H_2O \rightarrow Ca^{2+} + 2HSO_3^- \quad (a)$$

$$HSO_3^- + \tfrac{1}{2}O_2 \rightarrow H^+ + SO_4^{2-} \quad (b)$$

$$Ca^{2+} + SO_4^{2-} \rightarrow CaSO_4 \quad (c)$$

$$CaCO_3 + HSO_3^- + H^+ \rightarrow CaSO_3 + H_2O + CO_2 \quad (d)$$

$$SO_3 + H_2O \rightarrow 2H^+ + SO_4^{2-} \quad (e)$$

The CaSO$_3$ produced in the scrubber 3 reacts with the SO$_2$ it has absorbed by the formula (a), to form Ca$^{2+}$ and HSO$_3^-$. Part of the HSO$_3^-$ is then oxidized by O$_2$ in the gas to give H$^+$ + SO$_4^{2-}$, as expressed in the formula (b).

On the other hand, HSO$_3^-$ and H$^+$ are neutralized with the absorbent CaCO$_3$ and are converted, according to the formula (d), to CaSO$_3$, H$_2$O, and CO$_2$, the last-mentioned product being released in the gaseous form to the atmosphere. With increases in the concentrations, the resulting Ca$^{2+}$ and SO$_4^{2-}$ combine to form CaSO$_4$, as in the formula (c), which separates out in a solid phase in the same way as CaSO$_3$.

The gas from the boiler contains some SO$_3$ (sulfur trioxide), which is absorbed by the scrub liquid, as in the formula (e), to give H$^+$ and SO$_4^{2-}$.

It has been noted above that the present invention is predicated upon the unique phenomenon that occurs as CaSO$_4$ and CaSO$_3$ separate out in solid phases as expressed by the reaction formulas (c) and (d), respectively.

As already stated, the ratio between the productions of CaSO$_3$ and CaSO$_4$ of 82:18 is fixed critical, and if the proportion of CaSO$_4$ production is less than this, or conversely if the CaSO$_3$ production is excessive, CaSO$_4$ will be incorporated in the crystals of CaSO$_3$ produced in accordance with the formula (d), instead of emerging singly in a solid phase as expressed by the formula (c). This is presumably ascribable to the formation of a solid solution of the sulfite and sulfate. Although the mechanism is so complex that the details cannot be clarified at the present time, this presumption is deemed reasonable because the crystals of CaSO$_4$ that usually are microscopically observed with ease cannot be identified when the above-mentioned unusual phenomenon has occurred.

As will be clearly understood from the reaction formulas (b) and (c), CaSO$_4$ is produced as the HSO$_3^-$ that has resulted from the absorption of SO$_2$ from the exhaust gas by the absorbent is combined with O$_2$ in the gas. While, of course, SO$_4^{2-}$ is produced as in the formula (e), the amount of SO$_3$ in the gas is very little and apparently most of SO$_4^{2-}$ is formed in accordance with the reaction formula (b).

Therefore, the proportions of CaSO$_3$ and CaSO$_4$ to be produced depend upon the quantity of SO$_4^{2-}$ to be formed by O$_2$ in the gas.

Now if CaSO$_4$ has been produced to a proportion beyond the critical limit, CaSO$_4$ will separate out in a solid phase as expressed by the reaction formula (c).

The scrub liquid 4 that circulates through the scrubber 3 is partly extracted and led to a CaSO$_4$ classifier, e.g., a liquid cyclone, where part or whole of CaSO$_4$ is classified and returned as a CaSO$_4$-containing circulating liquid, or a seed crystal-circulating liquid 6, for example, from the bottom of the classifier 5 to the scrubber 3.

As the CaSO$_4$-containing circulating liquid 6 is sent back to the scrubber 3, the CaSO$_4$ being formed in the scrubber in accordance with the reaction formula (c) precipitates and grows over the surfaces of $CaSO_4$ crystals so returned. In other words, the $CaSO_4$ brought back to the scrubber acts as seeds for the growth with the $CaSO_4$ being formed by the reaction of the formula (c), thus preventing the scale formation in the scrubber.

Meanwhile, the scrub liquid 7 extracted from the top of the $CaSO_4$ classifier is supplied to a thickener 8, where the suspension is concentrated and is discarded as tailings 9 from the bottom of the thickener or, where necessary, the concentrate is sludged for subsequent disposal.

From the thickener 8 the supernatant fluid 10 is transferred to a scrub liquid preparation vessel 11, where it is mixed with $CaCO_3$ or $Ca(OH)_2$ to prepare fresh scrub liquid.

The scrub liquid 13 thus prepared is supplied to the scrubber 3 according to the need.

While the supply to the scrubber 3 may be controlled on the basis of the $SO_2$ concentration in the stack gas and the volume of the gas to be handled, it is also possible to control the supply so as to maintain the pH of the circulating liquid 4 at a predetermined level.

The supply of makeup water 2 is controlled by balancing it with the losses of water by evaporation into the gas for the cooling purpose as already described and also by the discharge out of the system as the moisture content of tailings 9. In the figure, the symbol M stands for the motor of an agitator.

A typical prior art porcess has so far been described in connection with FIG. 1, which is a flow sheet of the process operation where the proportion of $CaSO_4$ is larger than the critical ratio between $CaSO_3$ and $CaSO_4$ productions of 82:18, and $CaSO_4$ is singly released into the scrub liquid.

If, on the contrary, the $CaSO_4$ proportion is less than the $CaSO_3$-to-$CaSO_4$ ratio of 82:18, then any part of the circulating liquid 4 extracted and fed to a classifier such as a liquid cyclone 5 would not precipitate seed crystals of $CaSO_4$ and hence $CaSO_4$-containing circulating liquid 6 would not be returned from the bottom of the classifier 5 to the scrubber. Then, if the $CaSO_4$ proportion again exceeds the $CaSO_3$:$CaSO_4$ ratio of 82:18 because of a reduced load at night of the boiler or the like and partly due to an increase in the $O_2$ content of the stack gas, the seed crystal effect with the $CaSO_4$-containing circulating liquid 6 as has already been described with reference to FIG. 1 will not be achieved in the absence of $CaSO_4$ crystals in the scrub liquid 4 being circulated through the scrubber. As a result, there is a very great danger of $CaSO_4$ being formed in accordance with the reaction formula (c) and growing into $CaSO_4$ scale on the inside of the scrubber.

The present invention has for its object to provide a stack-gas treating process which overcomes the aforedescribed disadvantages of the prior art.

The object of the invention is realized, in accordance with the invention, by a wet process for stack gas treatment wherein the stack gas is scrubbed with a suspension containing calcium hydroxide and/or calcium carbonate to remove sulfur oxides from the gas, characterized in that (1) air or oxygen-containing gas is supplied to the gas scrubber so as to oxidize at least 18% of the sulfur oxides absorbed by the scrub liquid to gypsum, and then part of the gypsum from the gypsum-containing scrub liquid partly taken out is recycled to the scrubber, or (2) part or whole of the scrub liquid is taken out from the scurbber into an oxidizer, where it is oxidized with the supply of air or oxygen-containing gas, and, after the oxidation, part of the scrub liquid from the oxidizer is recycled to the scrubber, whereby at least 18% of the sulfur oxides absorbed from the gas by the scrub liquid is oxidized to gypsum.

The above and other objects and advantages of the invention will become more apparent from the following description taken in conjunction with the accompanying drawings, wherein:

FIG. 1 is a flow diagram explanatory of a typical stack-gas treating process of the prior art;

FIGS. 2 and 3 are flow diagrams explanatory of two different embodiments of the process of the invention; and FIG. 4 is a graph showing the relationship between the gypsum concentration and deposition rate.

As illustrated in FIG. 2, the present invention resides in a process for promoting the oxidation reaction represented by the reaction formula (b) by supplying a small quantity of air or oxygen 14 to the liquid reservoir at the bottom of the scrubber 3 as used in the prior art process shown in FIG. 1, in order that the $CaSO_4$ proportion may always be in excess of the $CaSO_3$-to-$CaSO_4$ production ratio of 82:18.

The air quantity can be controlled to a minimum required in consideration of the $O_2$ and $SO_2$ concentrations in the stack gas, the boiler load, and other factors.

Also, as illustrated in FIG. 3, the present invention resides in a process wherein part of the scrubber circulating liquid 4 is taken out into an oxidizer 15, where it is allowed to react, according to the formula (b), with air or oxygen 14 being supplied, and the resulting liquid 16 is returned to the reservoir at the bottom of the scrubber 3, so that the $CaSO_4$ proportion may be greater than at least the above-mentioned $CaSO_3$-to-$CaSO_4$ ratio of 82:18.

It will be readily appreciated that the higher the concentration of $CaSO_4$ the greater the seed crystal effect will be. With a full-scale unit for commerical operation, however, it is also clear that more difficulties will be involved with an increase in the slurry concentration.

For the operation of a full-scale plant, therefore, it is imperative to keep the seed crystal concentration at the irreducible minimum. To attain this end, varied researches have hitherto been made.

As the outcomes of those researches and also as a result of our work, it has been found most reasonable to adjust the $CaSO_4$ concentration in the scrubber circulating liquid within a range from 2 to 15% by weight by classifying gypsum by a classifier and circulating a resultant as seed crystals.

FIG. 4 graphically represents results of tests conducted on the correlation between the gypsum concentration and the scaling rate. Where the gypsum concentration is less than 2% by weight, scaling will occur seriously. With the concentration in excess of 15% by weight, the effect will be substantially unchanged, showing no merit of using the higher concentration.

The separate installation of the oxidizer makes the apparatus more complex than when the oxidation is effected in the liquid reservoir of the scrubber. However, this drawback is offset by the advantage of compact oxidizer design made possible by the compression of the air 14 to be supplied to the oxidizer 15.

The invention is illustrated by the following examples given together with comparison examples under identical test conditions.

Test 1

Stack gas from an oil-fired furnace was scrubbed for SOx removal at a rate of 2000 Nm³ per hour by a packed column, 600 mm in diameter and 10 meters in height, packed with lattice-shaped packings and having a gas-cooling and dedusting zone, 200 mm across and 2 meters high, in the upper section. The results of the test conducted in accordance with a prior art process are given in Comparison Example 1 and the results according to this invention in Example 1.

In either case the scrub liquid was prepared by suspending limestone, pulverized to a size such that 95% of the resultant passed a #325 sieve, in water to the proportions of 1.5 mol/l. The liquid was supplied so that the pH value of the scrubber circulating liquid 4 was 5.5. Excess liquid was taken out to keep a constant level in the reservoir at the bottom of the scrubber 3. (Comparison Example 1)

| | |
|---|---|
| $SO_2$ in the gas at the inlet: | 3320 ppm |
| | (on the dry basis) |
| $O_2$ in the gas at the inlet: | 5.2% |
| | (on the dry basis) |
| $SO_2$ in the gas at the outlet: | 157 ppm |
| | (on the dry basis) |
| Composition ratios of scrub liquid taken out | |
| Residual $CaCO_3$: 5.7% | (as $CaCO_3$/Total Ca, on the molar basis) |
| $CaSO_3$:$CaSO_4$* = 88:12 | (on the molar basis) |
| Presence of $CaSO_4$ crystals in the liquid: | |
| | Microscopic examination did not reveal the presence. |

*The $CaSO_4$ proportion was calculated by deducting the amount of $SO_3$ salt from the total S amount.

(Example 1)

| | |
|---|---|
| $SO_2$ in the gas at the inlet: | 1650 ppm |
| | (on the dry basis) |
| $O_2$ in the gas at the inlet: | 6.2% |
| | (on the dry basis) |
| $SO_2$ in the gas at the outlet: | 75 ppm |
| | (on the dry basis) |
| Composition ratios of scrub liquid taken out | |
| Residual $CaCO_3$: 5.2% | (as $CaCO_3$/Total Ca, on the molar basis) |
| $CaSO_3$:$CaSO_4$* = 73:27 | (on the molar basis) |
| Presence of $CaSO_4$ crystals in the liquid: | |
| | Microscopic examination clearly revealed the presence of crystals inherent to $CaSO_4$ in the form of plates and columns. |

*The $CaSO_4$ proportion was calculated by deducting the amount of $SO_3$ salt from the total S amount.

Test 2

Using the same apparatus as used for Test 1, similar experiments were done and the results were obtained as in Comparison Example 2 and Example 2.

(Comparison Example 2)

In the process represented in FIG. 1, the gypsum classifier 5 was eliminated, and the scrub liquid was passed through the thickener 8, and then the tailings were discarded whereas the supernatant fluid was used to prepare fresh scrub liquid.

| | |
|---|---|
| $SO_2$ conc. in the gas at the inlet: | 1650 ppm |
| | (on the dry basis) |
| $SO_2$ conc. in the gas at the outlet: | 73 ppm |
| | (on the dry basis) |
| $O_2$ conc. in the gas at the inlet: | 6.3% |
| | (on the dry basis) |

After 115 hours of continuous test, the inside of the scrubber was inspected and scale containing $CaSO_4$ as the principal ingredient was noted in an end surface of the packing.

(Example 2)

$CaSO_4$ crystal (obtained after oxidizing the total amount of $CaSO_4$ by oxidizing means previously provided in the same test apparatus, it was filtered and regulated by a centrifugal separator for convenience' sake) was added to a washing liquid so as to show $CaSO_4$ 5 wt% (as $CaSO_4.2H_2O$) and then the resulting mixture was added to a liquid reservoir at the bottom of the scrubber 3 for test purposes.

| | |
|---|---|
| $SO_2$ conc. in the gas at the inlet: | 1650 ppm (dry base) |
| $SO_2$ conc. in the gas at the outlet: | 75 ppm (dry base) |
| $O_2$ conc. in the gas at the inlet: | 6.3% (dry base) |

After 1125 hours of continuous test, the inside of the scrubber was inspected and as the result, the formation of scale was hardly noted.

What is claimed is:

1. A wet process for stack gas treatment wherein the stack gas is scrubbed in a scrubber with a scrubbing suspension containing calcium hydroxide, calcium carbonate, or mixtures thereof to remove sulfur oxides from the gas, characterized in that at least a part of the scrubbing suspension is taken out from the scrubber into the oxidizer, where it is oxidized with a supply of air or oxygen containing gas and, after the oxidation, all of the scrubbing suspension from said oxidizer is recycled to said scrubber whereby at least 18% of the sulfur oxides absorbed from the gas by said scrubbing suspension is oxidized to gypsum, the concentration of calcium sulfate in said scrubbing suspension being from 2 to 15% by weight of the total weight of the liquid in said scrubbing suspension.

* * * * *